(12) United States Patent
Swami et al.

(10) Patent No.: US 12,299,676 B2
(45) Date of Patent: May 13, 2025

(54) SYSTEMS AND METHODS FOR OVERCLOCKING MINING RIGS

(71) Applicant: MARA Holdings, Inc., Las Vegas, NV (US)

(72) Inventors: Ashu Swami, Tampa, FL (US); Jim Crawford, Parker, CO (US); Raymond Walintukan, Wenatchee, WA (US); Alven Diaz, Bakersfield, CA (US)

(73) Assignee: MARA Holdings, Inc., Las Vegas, NV (US)

( * ) Notice: Subject to any disclaimer, the term of this patent is extended or adjusted under 35 U.S.C. 154(b) by 407 days.

(21) Appl. No.: 17/975,229

(22) Filed: Oct. 27, 2022

(65) Prior Publication Data

US 2024/0144249 A1    May 2, 2024

(51) Int. Cl.
*G06Q 20/36* (2012.01)
*G06Q 20/38* (2012.01)
*G06Q 20/40* (2012.01)

(52) U.S. Cl.
CPC ....... *G06Q 20/3678* (2013.01); *G06Q 20/389* (2013.01); *G06Q 20/401* (2013.01)

(58) Field of Classification Search
CPC .......................... G06Q 20/3678; G06Q 20/401
USPC ....................................................... 713/322
See application file for complete search history.

(56) References Cited

U.S. PATENT DOCUMENTS

| | | |
|---|---|---|
| 2017/0243176 A1 | 8/2017 | Hanke et al. |
| 2019/0370793 A1* | 12/2019 | Zhu .......................... H04L 9/50 |
| 2021/0083876 A1* | 3/2021 | Harms ............... G06Q 20/0658 |
| 2021/0174442 A1* | 6/2021 | Trudeau ............... G06Q 20/389 |
| 2022/0006641 A1* | 1/2022 | Snow .................... H04L 9/0869 |
| 2022/0019258 A1 | 1/2022 | Remple |
| 2022/0123941 A1* | 4/2022 | Steinberg ............ H04L 63/1441 |
| 2024/0168538 A1* | 5/2024 | Hu ........................ G06F 1/3243 |

FOREIGN PATENT DOCUMENTS

WO        2021055635 A1    3/2021

* cited by examiner

*Primary Examiner* — Paul R. Myers
(74) *Attorney, Agent, or Firm* — Fish IP Law, LLP

(57) ABSTRACT

Efficiency of a mining rig is improved by altering clock speed of an ASIC. Cock speed can be modified as a function of values for (B) a block reward for mining the cryptocurrency, (R) exchange ratio of a price of a cryptocurrency reward to a currency of a country, (D) difficulty or network hashrate, and (P) unit cost of electricity used to operate the ASIC, according to the function, B×R/D∝P×∂E/∂i+∂G/∂i, where for overclocking by i percentage, an effective hashrate is 1+i, Ei is a change in an amount of electricity consumed, and Gi is a degradation or economic loss of the processor. ∂E/∂I can be inferred from temperature measurements and historical or calculated data. A mining rig can communicate with a blockchain network via a mining pool, with information from an oracle or a centralized crypto exchange.

22 Claims, 8 Drawing Sheets

SYSTEMS AND METHODS FOR OVERCLOCKING MINING RIGS

FIELD OF THE INVENTION

The field of the invention is computer processing, especially improving efficiency of an ASIC mining rig by altering clock speed.

BACKGROUND

The following background description includes information that may be useful in understanding the present invention. It is not an admission that any of the information provided herein is prior art or relevant to the presently claimed invention, or that any publication specifically or implicitly referenced is prior art.

Many cryptocurrencies including bitcoin use a process called 'mining' or 'proof-of-work' to validate transactions on the cryptocurrency's public ledger a.k.a. chain. Transactions are bundled in blocks that are added to the chain in roughly equal periods called block time or epoch. Bitcoin's block time is approximately 10 minutes. Entities doing this activity for profit are called 'miners'. Miners are rewarded for their efforts in the native cryptocurrency of the chain via a special transaction in the newly added block which serves the dual purpose of adding new coins to the monetary supply and depositing those as mining reward to the miner's wallet.

Mining involves solving a complex cryptographic puzzle by computers. The puzzle has two properties that are essential to the design of cryptocurrency.

The first property is that the puzzle is made of one-way cost functions called hashes, such as sha-256-d for bitcoin chain. The output of the function is called a digest. Given an input, it is trivial to generate a digest using the hash function. But given a digest, it is virtually impossible to find an input that generates that digest. This property ensures that when a miner finds the solution to the puzzle, they can broadcast it to the network and anyone on the network can verify near-instantaneously that it is the correct solution. This allows the network to recognize the first miner to find the solution to be recognized as the winner and win the block reward for that epoch.

The second property is that the puzzle can only be solved by trying out a large number of random executions of the hash function, and comparing the digests with a number provided by the puzzle, called 'difficulty'. If a digest is smaller than 'difficulty', then a solution to said to be found and a new block can be added to the chain. Since the digests of a hash function form a uniform distribution from 0 to n ($n=2^{256}$ for sha-256), this property means that the time it will take to solve the puzzle only depends on (a) the number of hashes that can be executed by all the miners in a unit time, called network hashrate, and (b) the 'difficulty'. E.g. if 'difficulty'=$1\pm(2^{256})$, then the first digest itself is guaranteed to be less than 'difficulty', however if 'difficulty' is 100 then it will take on average $(2^{256})/100$ hashes to find one that is less than the 'difficulty'. Therefore, difficulty gives us the expected number of hashes it will take to find a solution. If we multiply that expected number of hashes with the hashrate of the network, we get the expected time it will take to generate a new block.

Since the network hashrate is continuously changing, the time in which a new block is found will also be changing. But the chain software aims to have a block generated only once every block time, which is a constant. The software can easily do that by changing the 'difficulty'. The software monitors the average time in which the blocks are being generated and after every fixed number of blocks (2016 blocks for bitcoin chain), it changes the difficulty of the puzzle to ensure that the current network hashrate will be able to generate a new block only once in block time.

This design of the puzzle where the reward is constant and the probability of a miner winning the reward is proportional to the ratio of their hashrate to the hashrate of the network mimics a 'congestion game'. As long as the mining reward is higher than the resources spent to generate the hashes i.e. the cost of hardware and electricity, the miners have an incentive to keep adding more hardware to acquire a greater percentage of the network hashrate to increase their chances of winning a block. However, by doing that they are also undermining the efforts of other miners and, therefore, there exists a game-theoretic optimum where miners should not be adding more hashrate even if it is profitable in the near term. But cooperation in a decentralized global network is impractical, therefore, the next best strategy for the miners is to monitor the given conditions of the network and alter their operations accordingly in real-time. These conditions are specifically:

i) D: the 'difficulty' or the network hashrate, since they are both proportionate;
ii) B: the block reward;
iii) C: the cost of electricity consumed by the hardware to generate a unit hashrate. $C \propto P \times E$ where P is the cost of unit electricity and E is efficiency of the hardware; and
iv) R: the exchange ratio of the native cryptocurrency which is rewarded to the miners and the currency in which the hardware and electricity costs are denominated which is typically the fiat currency of the country of operations.

D is changed dynamically by the chain. For bitcoin chain this time is approximately 2 weeks B is changed either in a predetermined fashion or dynamically by the chain. For bitcoin chain it is halved roughly every 4 years P is usually constant for a miner for relatively long periods.

E is usually fixed for the normal operation mode of a hardware. But the hardware that is typically used for mining has the ability to be run at different variations of clock frequencies and voltages. Those variations have a non-linear relationship between the hashrate a clock frequency produces to the power it consumes at that clock frequency, therefore, E varies in those variations.

R is continuously changing and determined by many macro factors beyond mining

Of all the variables above, C is the only one which a miner can somewhat control. Furthermore, P has a lower floor which is determined by the cost of power generation and transmission, however, E is continuously being lowered due to advancements in chip design and fabrication technology.

These advancements in E have led to the emergence of specialized hardware called Application Specific Integrated Circuits (ASICs). ASICs have a value of E that is only a fraction ($\frac{1}{1,000,000}$ and continuously getting lower with newer generation ASICs) of that for a traditional server CPUs. As a result, traditional server CPUs can no longer profitably mine popular cryptocurrencies such as bitcoin. See prior art FIG. 1.

Hundreds of ASICs are packaged into a server type machine called a mining rig. The rig communicates with the blockchain network via a mining pool and a protocol such as Stratum protocol. The rigs in a datacenter are usually monitored for their health (ASIC temperatures, fan speed, hashrate etc) using a Fleet Management Software (FMS). See prior art FIG. 2.

Problem

ASICs generate large amounts of heat during operation and as a result have much shorter life span than general purpose CPUs. In order to keep 'E' low, it is not economically feasible to cool these with air-conditioning. However, other low-cost heat dissipation techniques such as immersion and evaporative cooling are a field of constant innovation among ASIC manufacturers and ASIC operators. Effective heat dissipation allows operating ASICs at a higher clock frequency leading to more computations in unit time (higher hashrate), while consuming more power and generating more heat.

However, there are two more considerations in addition to the sustainable heat dissipation rate, that must be taken into account while overclocking the ASICs.

One, during overclocking, the power consumption of the ASICs increases more than linearly with hashrate, therefore, at some point the marginal cost of power starts exceeding the marginal increase in reward from increased hashrate. See prior art FIG. 3.

As a result, the optimum overclocking that yields the highest profitability at any given time for a rig is a continuously changing target. When the exchange rate (R) is high or difficulty (D) is low, it shifts to higher overclock for all miners, and vice versa. Similarly, other factors being the same (R & D), the optimum overclock number is higher for miners with lower C.

Two, overclocking is expected to slightly reduce the usable lifespan of the ASICs. These are longer term effects and data must be collected from the field to predict these effects.

As of today, there is no mechanism in any mining rigs, pools or FMSs to monitor the variables (D, B, P, E, R) in addition to the long-term effect of overclocking on rig lifespan and determine the optimum overclock for the rigs.

Accordingly, there is still a need to provide apparatus, systems, and methods in which efficiency of a mining rig is improved by altering clock speed of an ASIC or other processor.

SUMMARY OF THE INVENTION

The inventive subject matter provides apparatus, systems, and methods in which efficiency of a mining rig is improved by altering clock speed of a processor.

In preferred embodiments, the processor comprises an ASIC, and efficiency is related to expected profitability of the rig in mining for a cryptocurrency. In such embodiments, the clock speed can be modified as a function of values for parameters B, R, D, and P. These parameters are considered to be constants in short term, and not usually impacted very much by a miner's overclocking decisions:

i) B comprises a block reward for mining the cryptocurrency;
  ii) R comprises an exchange ratio of a price of the cryptocurrency which is rewarded to a miner and a currency of a country of operation;
  iii) D comprises at least one of a difficulty and a network hashrate; and
  iv) P comprises a unit cost of electricity used to operate the ASIC These parameters can be advantageously utilized in conjunction with the function, $B \times R/D = P \times \partial E/\partial i + \partial G/\partial i$, where for overclocking by i percentage, an effective hashrate is $1+i$, $E_i$ is a change in an amount of electricity consumed, and $G_i$ is a degradation or economic loss of the ASIC.

$\partial E/\partial i$ can be inferred from measurements obtained from voltage, current and temperature sensors local to the mining rig, along with historical or calculated data. $E_i$ can be calculated in any suitable manner, including using manufacturer data, data derived by applying different combinations of overclock i to the ASIC, and reading corresponding changes to power consumption $E_i$.

The function can be used to dynamically change the overclocking rate over time. For example, re-calculation of the data used to determine desired overclocking speeds at different points in time can be triggered by a change in a predetermined magnitude of at least one of B, R, D, and P.

A mining rig can advantageously communicate with a blockchain network via a mining pool. Contemplated communication can include providing data to the mining pool and/or receiving from the mining pool, alerts, values for one or more of least one of B, D, R, and suggested overclocking rates. It is also contemplated that the received information can come from an oracle or an API to a centralized crypto exchange.

A mining rig might or might not use default values for any one or more of D, R, and $\partial G/\partial I$, with any of the default values potentially being overridden. Based upon the data used to determine desired overclocking speed, it is also contemplated that mining rig might be shut down altogether, pending more favorable data.

Various objects, features, aspects and advantages of the inventive subject matter will become more apparent from the following detailed description of preferred embodiments, along with the accompanying drawing figures in which like numerals represent like components.

DETAILED DESCRIPTION

Throughout this application, multiple references are made regarding servers and processors. It should be appreciated that the use of such terms is deemed to represent one or more computing devices having at least one processor configured to execute instructions on a computer readable tangible, non-transitory medium as software, hardware or firmware. For example, a server can include one or more computers operating as a web server, database server, or other type of computer server in a manner to fulfill described roles, responsibilities, or functions.

As used herein, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention. Unless a contrary meaning is explicitly stated, all ranges are inclusive of their endpoints, and open-ended ranges are to be interpreted as bounded on the open end by commercially feasible embodiments.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Figure 1:
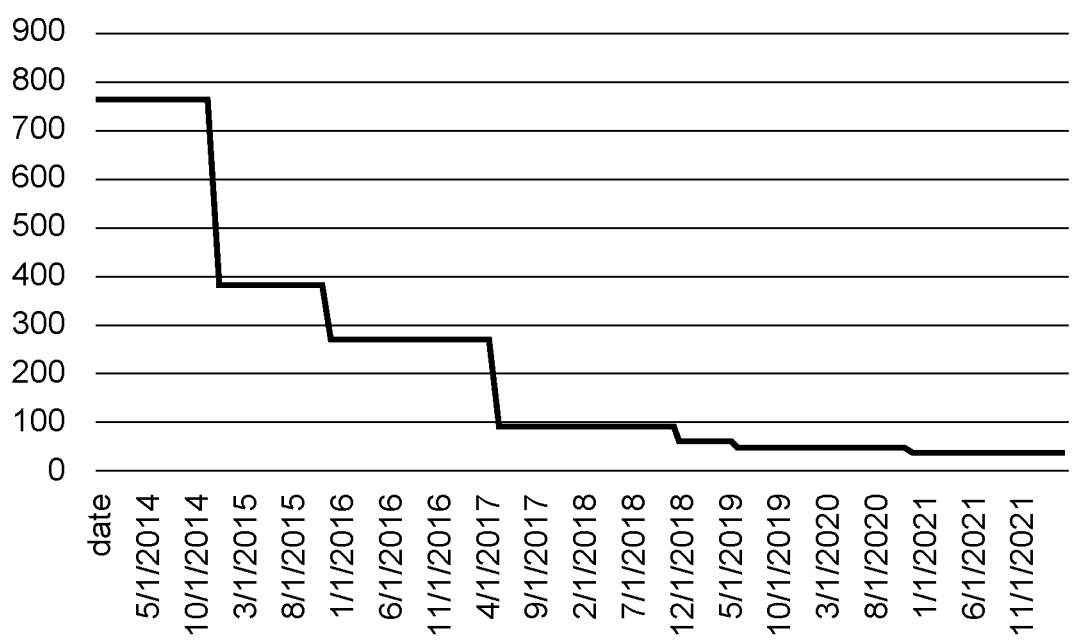
FIG. 1 is a graph showing energy usage measured in Joules/Tera-hashes for latest generation ASICs over time.
Figure 2:
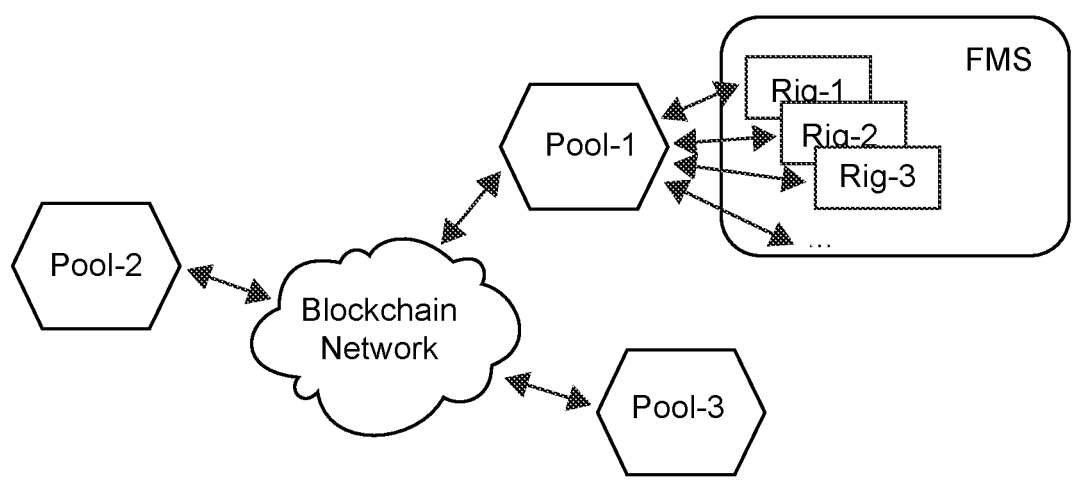
FIG. 2 is a schematic showing multiple pools of cryptocurrency mining rigs electronically coupled to a blockchain network.
Figure 3:
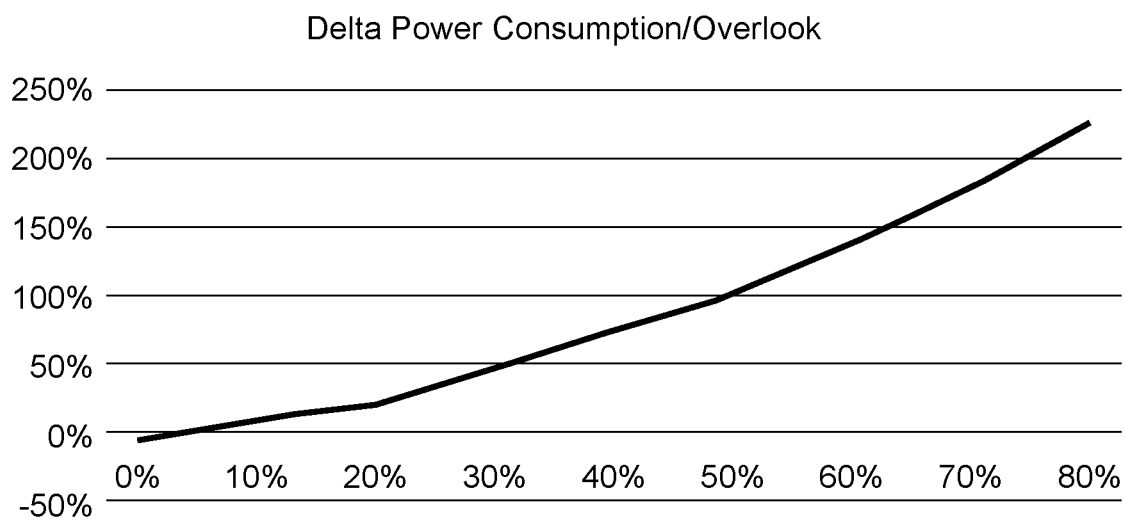
FIG. 3 is a graph showing increase in power consumption over overclock (increase in hashrate) for a latest generation ASIC in immersion cooling environment.
Figure 4:
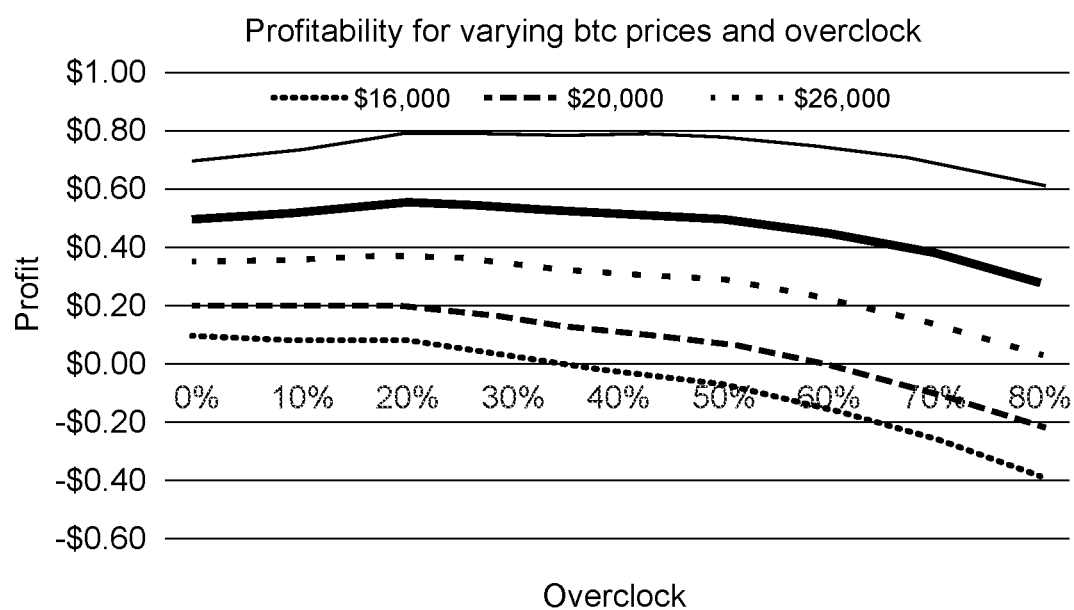
FIG. 4 is a graph showing decreasing profitability for varying bitcoin prices relative to amount over overclocking.
Figure 5:
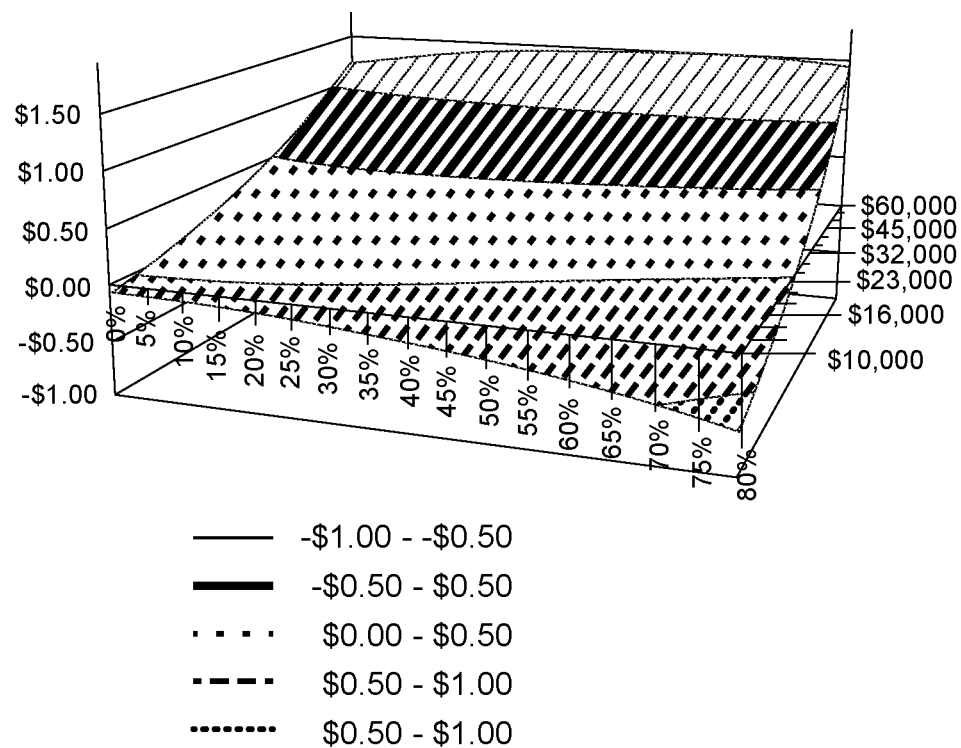
FIG. 5 is a graph showing profitability for varying bitcoin prices relative to amount over overclocking.
Figure 6:
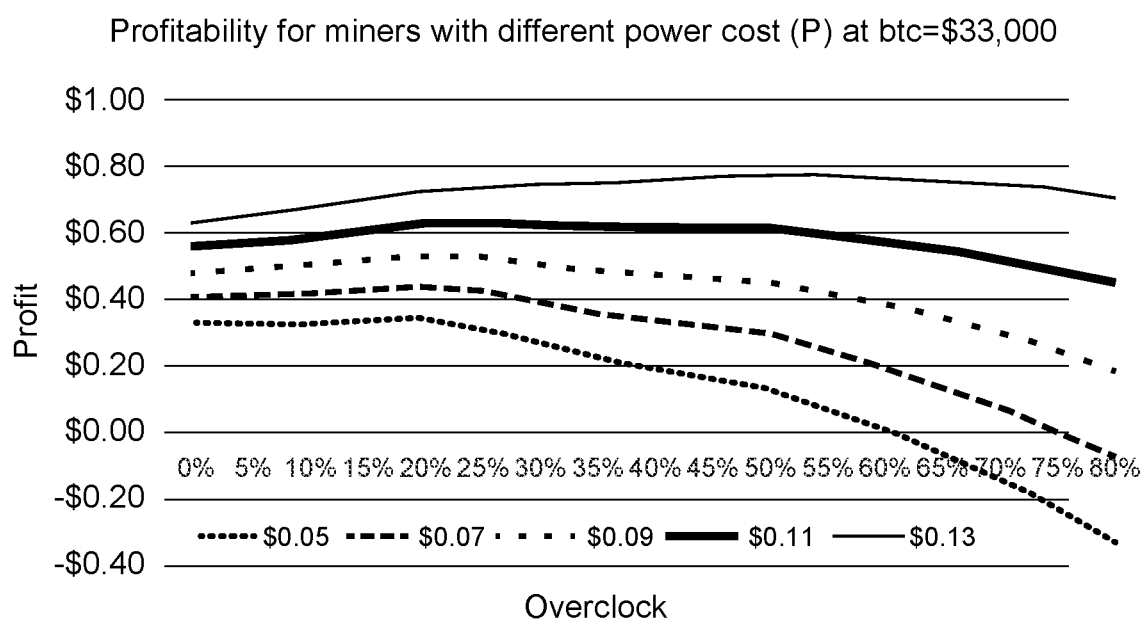
FIG. 6 is a graph showing decreasing profitability for varying power costs prices relative to amount over overclocking.

FIGS. 4-6 depict graphs of profitability using functions described herein. FIG. 4 is a graph showing decreasing profitability for varying bitcoin prices relative to amount over overclocking. FIG. 5 is a graph showing profitability for varying bitcoin prices relative to amount over overclocking. FIG. 6 is a graph showing decreasing profitability for varying power costs prices relative to amount over overclocking.

Figure 7:
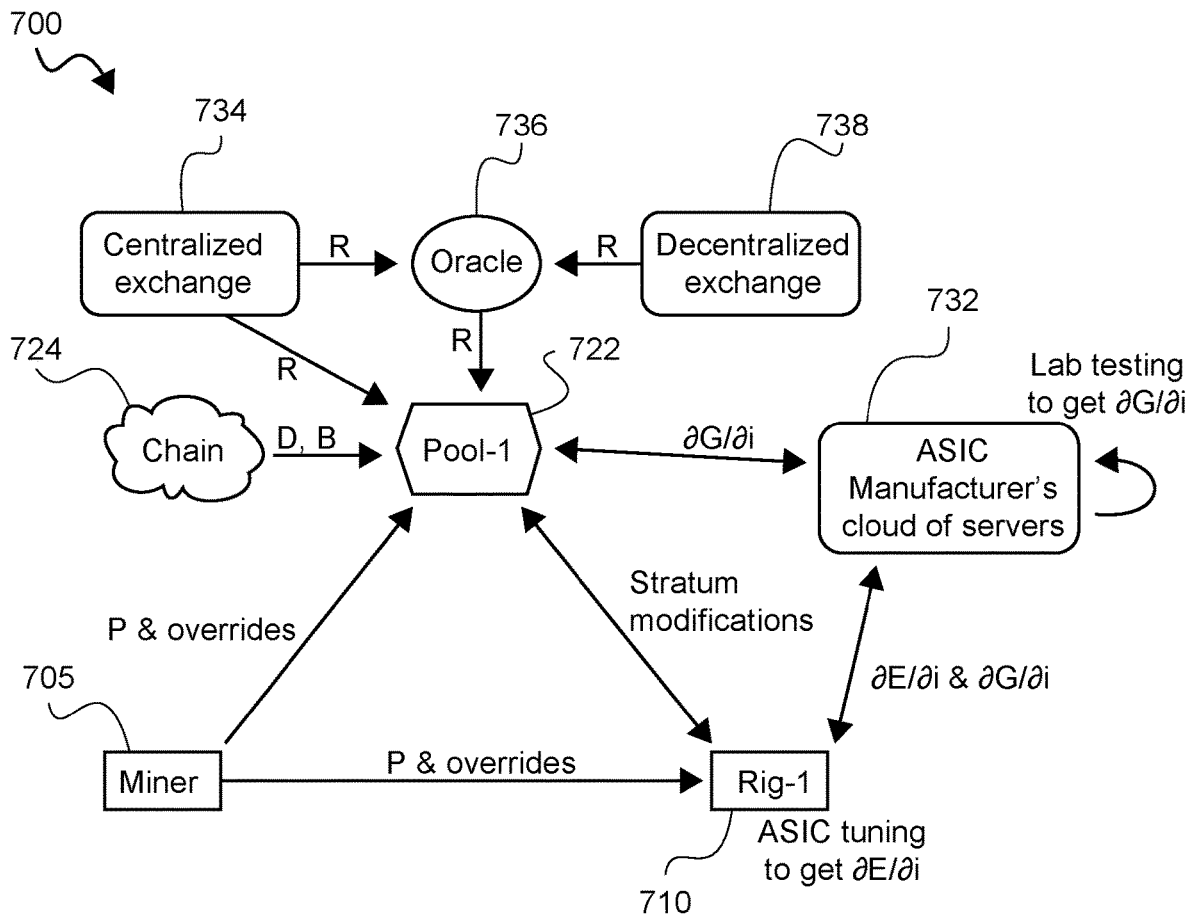
FIG. 7 is a schematic showing interrelationships among a miner, a mining rig, a mining pool, and various information sources.

FIG. 7 is a schematic showing a system 700 having interrelationships among a miner 705, a mining rig 710, a mining pool 722, a blockchain 724, a manufacturers cloud or servers 732, a centralized exchange 734, an oracle 736, and a decentralized exchange 738.

In preferred embodiments, the processor being overclocked comprises an ASIC, and efficiency is related to expected profitability of the rig in mining for a cryptocurrency. In particular, the clock speed can be modified as a function of values for parameters B, R, D, and P.
  i) B comprises a block reward for mining the cryptocurrency;
  ii) R comprises an exchange ratio of a price of the cryptocurrency which is rewarded to a miner and a currency of a country of operation;
  iii) D comprises at least one of a difficulty and a network hashrate; and
  iv) P comprises a unit cost of electricity used to operate the ASIC Other relevant parameters are as follows:
  i) Gi represents the degradation or economic loss of an ASIC when the ASIC is overclocked by i percentage;
  ii) Effective hashrate after overclock=1+I; i.e. If an ASIC that was generating H hashes per second previously is overclocked by i percentage, then it will generate $H \times (1+i)$ hashes/second;
  iii) The revenue of an $ASIC \propto B \times R \times H \times (1+i)/D$. For bitcoin, revenue=$2^{-32} \times B \times R \times H \times (1+i)/D$;
  iv) E changes with overclock, and Ei is as the change in amount of electricity consumed when an ASIC is overclocked by i percentage. For example, if a rig is overclocked by i=40% and it increases power consumption by 80%, then Ei=80%;
  v) After overclocking, new power consumption per hash=$E \times (1+Ei)$; and
  vi) The cost of running the ASIC=$H \times P \times E(1+Ei)+H \times Gi$.

Using these definitions, the optimum overclock percentage is the value of i that maximizes the function (operating profit): $H \times (2^{-32} \times B \times R \times (1+i)/D - P E \times (1+Ei)+Gi)$. This function is a curve and therefore, the maxima occurs when the derivative to the independent variable i is equal to 0. The maxima happens when: $2^{-32} \times B \times R/D = P \times \partial E/\partial i + \partial G/\partial i$.

Overclocking of rig 710 is preferably implemented at the calculated optimum overclock percentage. However, since some of the underlying values can change quickly, overclocking can advantageously be implemented to fall within 10% of a calculated maxima of the function, more preferably with 10% of a calculated maxima of the function, still more preferably with 5% of the calculated maxima, still more preferably with 2% of the calculated maxima, and most preferably at the calculated maxim. Overclocking with any of these differences from the calculated maximum are referred herein as near optimum overclocking. As used herein a desired overclocking includes optimum overclocking and near overclocking.

The recitation of these and other ranges herein is merely intended to serve as a shorthand method of referring individually to each separate value falling within the range. Unless otherwise indicated herein, each individual value is incorporated into the specification and claims as if it were individually recited herein, and all ranges include their endpoints.

Mining rig 710 can advantageously communicate with a blockchain network via a mining pool 722. Contemplated communication can include providing data to the mining pool 722 and/or receiving from the mining pool 722, alerts, values for one or more of least one of B, D, R, and suggested overclocking rates. In order to communicate with the network, the pool 722 runs a blockchain node (not shown), and maintains a copy of the ledger (chain) 724. D and R are available from the chain 724.

The pool 722 can receive R either from an oracle 736 or an API to a centralized crypto exchange 734 or a centralized crypto exchange 738. Oracle 736 is a software that bridges a blockchain ecosystem such as a pool, with an external world database such as a crypto exchange and transmits data between these two environments.

$\partial E/\partial i$ for all values of i, typically ranging from −50% to +100% can be available on the rig 722 itself. These can be provided in 3 different ways:

In one scenario, an ASIC manufacturer server 732 can provide a data table of these values for different values of ambient temperature about the ASIC. The data table is stored in a file on the rig 710. The rig 710 can read real-time ambient temperature from a temperature sensor 714 or other IoT sensors (not shown), and infer the corresponding values of $\partial E/\partial i$ from the data table.

In a second scenario, the data table is not necessarily stored on the rig 710 but it is stored in cloud or some other servers (not shown) eternal to the rig 710, and other than with an ASIC manufacturer server 732. The rig 710 fetches the entire data table or just the corresponding value of $\partial E/\partial i$ for the current ambient temperature in real-time.

In a third scenario, the rig 710 generates the data table itself, either during the initialization or at some point during its operation when specifically directed to do so, or automatically at periodic intervals. In order to generate this data, the rig 710 tries different combinations of overclock i to the ASICs and reads corresponding change to power consumption Ei and stores these values in a file which can be accessed later. This process is called ASIC tuning. Instead of storing the information in a file, the rig 710, instead tunes the ASICs to recalculate the data every time any of the other variables in the equation changes significantly and the rig 710 needs to recalculate the new optimum, or other near optimum, overclock.

$\partial G/\partial i$ for all values of i, typically ranging from −50% to +100% are preferably inferred over a long period of time when some ASICs have failed due to repeated overclocking. This data can be provided by the ASIC manufacturer servers 732 and shared with the rig in following ways:

$\partial G/\partial i$ can be collected by the ASIC manufacturer in any suitable manner, including through large scale testing of the ASICs done in laboratory settings; and by customer rigs that are deployed reporting the data from actual operations, either via the pool they are connected to or via a direct API provided by the manufacturer.

P can be derived from any available source, including for the example, from the miner 705 or even directly from a power provider (not shown). The miner 705 can preferably set override default values of D, R or $\partial G/\partial I$, on the pool 722 or on the rig 710. Based upon the data used to determine desired overclocking speed, it is also contemplated that mining rig might be shut down altogether, pending more favorable data.

Communications between the pool 722 and the rig 710 can use any suitable protocol, including for example the Stratum protocol, modified to provide the rig 710 with values for the following parameters, either at regular intervals or when demanded by the rig:
  i) real-time D, B, R;
  ii) optionally P if set on the pool;
  iii) optionally $\partial G/\partial i$ if it is read by the pool from external servers; and
  iv) optionally other overrides set by the miner on the pool as described above.

A variant of the system is contemplated in which the protocol communicates some or all of this data from the rig 710 to the pool 722, and the pool 722 communicates back to the rig 710, ideal overclock rate back to the rig 710 an optimum, or other near optimum, overclock.

Figure 8:
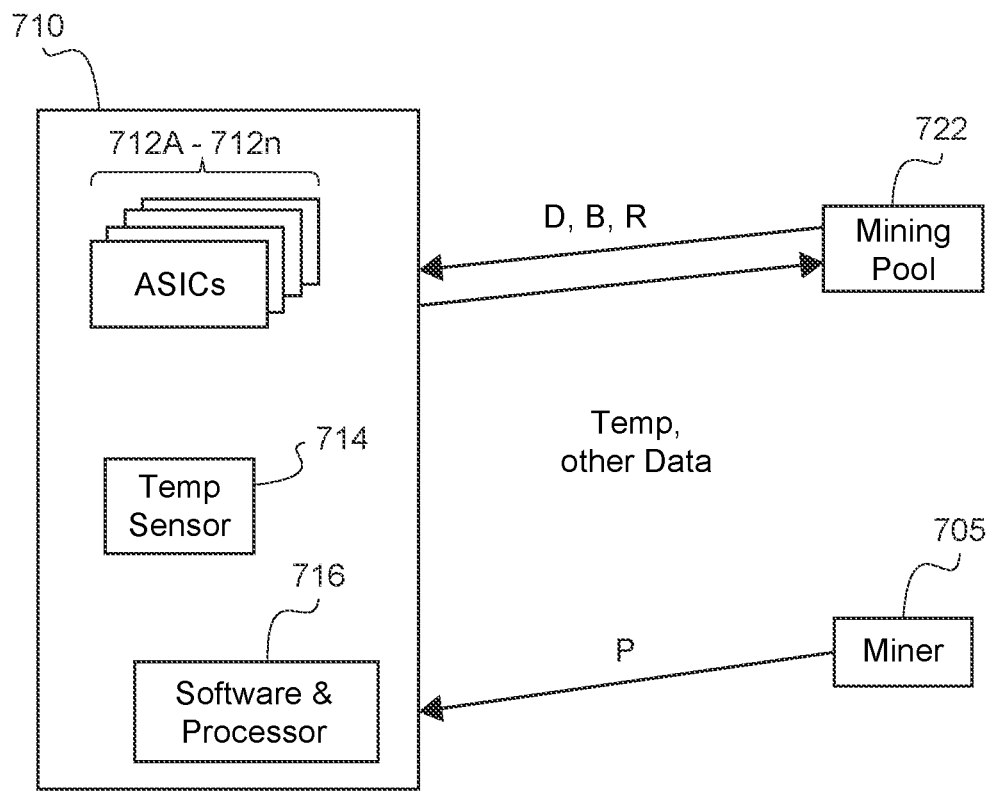
FIG. 8 is a schematic showing components of the mining rig of FIG. 7, as well as communications among the mining rig, mining pool, and miner.

Optional alerts generated by the pool or the rig that communicate the miner of changes to overclock rate above a threshold that is either predefined or set by the miner FIG. 8 is a schematic of the rig 710 having one or more ASICs 712A-712n, a temperature sensor 714, overclocking software 716 and a general purpose processor 718, and data communications with the mining pool 722 and the miner 705.

Overclocking software 716 operates on processor 718 to dynamically adjust an overclocking rate of one or more of the ASICs, as a function of temperatures derived from the temperature sensor 714, and values for D, B, R, and P, using functions and potentially other parameters discussed above.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of modifying power consumption of a rig used to mine a cryptocurrency, the method comprising:
  determining a desired overclocking rate of an ASIC as a function of values for the following parameters, wherein:
    B comprises a block reward for mining the cryptocurrency;
    R comprises an exchange ratio of a price of the cryptocurrency which is rewarded to a miner and a currency of a country of operation;
    D comprises at least one of a difficulty and a network hashrate;
    P—comprises a unit cost of electricity used to operate the ASIC; and
  implementing the desired overclocking rate on the ASIC.

2. The method of claim 1, wherein:
  following overclocking by i percentage, an effective hashrate is 1+i;
  Ei comprises a change in an amount of electricity consumed when the ASIC is overclocked by i percentage; and
  Gi comprises a degradation or economic loss of the ASIC when the ASIC is overclocked by i percentage; and
  the function comprises $2^{-32} \times B \times R/D = P \times \partial E/\partial i + \partial G/\partial i$.

3. The method of claim 2, further comprising implementing the desired overclocking rate on the ASIC within 5% of a calculated maxima of the function.

4. The method of claim 2, further comprising implementing the desired overclocking rate on the ASIC within 2% of a calculated maxima of the function.

5. The method of claim 2, further comprising utilizing the function to dynamically change the implemented desired overclocking rate on the ASIC.

6. The method of claim 2, further obtaining a temperature measurement from a temperature sensor, and using (a) the temperature measurement and (b) historical or calculated data to infer $\partial E/\partial i$.

7. The method of claim 6, where the data comprises information provided by manufacturer.

8. The method of claim 6, wherein the data is derived by applying different combinations of overclock i to the ASIC, and reading corresponding changes to power consumption Ei.

9. The method of claim 6, further comprising triggering re-calculation of the data by a change in a predetermined magnitude of at least one of B, R, D, and P.

10. The method of claim 6 wherein the ASIC is part of a mining rig that communicates with a blockchain network via a mining pool, and further comprising communicating at least a portion of the data to the mining pool, receiving a corresponding suggested overclocking rate from the mining pool, and implementing the suggested overclocking rate.

11. The method of claim 6 wherein the ASIC is part of a mining rig that communicates with a blockchain network via a mining pool, and further comprising communicating at least a portion of the data to the mining pool, receiving a corresponding alert from the mining pool.

12. The method of claim 2, further comprising overriding default values of at least one of D, R, and ∂G/∂I when determining the desired overclocking rate.

13. The method of claim 1, further comprising dynamically triggering a change the implemented overclocking rate on the ASIC by a change in at least one of B, R, D, and P.

14. The method of claim 1, further comprising turning off the ASIC based upon an expected profitability as determined by the function.

15. The method of claim 1, wherein the ASIC is part of a mining rig that communicates with a blockchain network via a mining pool, and further comprising deriving at least one of B, D, and R from the mining pool.

16. The method of claim 13, wherein the ASIC is part of a mining rig that communicates with a blockchain network via a mining pool, and further comprising using a modified Stratum protocol to derive at least one of B, D, and R from the mining pool.

17. The method of claim 1, further comprising receiving at least one of B, D, and R from an oracle or an API to a centralized crypto exchange.

18. An apparatus used to mine a cryptocurrency, comprising:
   a processor;
   voltage and current sensors;
   a temperature sensor; and
   DVFS (dynamic voltage frequency scaling) software configured to dynamically adjust the voltage and overclocking rate of the processor as a function of a temperature derived from the temperature sensor, and values for the following parameters, wherein:
   B comprises a block reward for mining the cryptocurrency;
   R comprises an exchange ratio of a price of the cryptocurrency which is rewarded to a miner and a currency of a country of operation;
   D comprises at least one of a difficulty and a network hashrate;
   P comprises a unit cost of electricity used to operate the ASIC.

19. The apparatus of claim 18, wherein:
following overclocking by i percentage, an effective hashrate is 1+i;
Ei comprises a change in an amount of electricity consumed when the ASIC is overclocked by i percentage; and
Gi comprises a degradation or economic loss of the ASIC when the ASIC is overclocked by i percentage; and
the function comprises $B \times R/D = P \times \partial E/\partial i + \partial G/\partial i$.

20. The apparatus of claim 18, wherein the communication software is configured to communicate with a blockchain network via a mining pool, and derive at least one of B, D, and R from the mining pool.

21. The apparatus of claim 20, wherein communication software uses a modified Stratum protocol.

22. The apparatus of claim 18, wherein the communication software is configured to receive at least one of B, D, and R from an oracle or an API to a centralized crypto exchange.

* * * * *

UNITED STATES PATENT AND TRADEMARK OFFICE
CERTIFICATE OF CORRECTION

| | | |
|---|---|---|
| PATENT NO. | : 12,299,676 B2 | Page 1 of 1 |
| APPLICATION NO. | : 17/975229 | |
| DATED | : May 13, 2025 | |
| INVENTOR(S) | : Ashu Swami et al. | |

It is certified that error appears in the above-identified patent and that said Letters Patent is hereby corrected as shown below:

On the Title Page

Item (57) Line 2, in the abstract:
"Cock ..." should read "Clock ...".

Signed and Sealed this
Twenty-ninth Day of July, 2025

Coke Morgan Stewart
*Acting Director of the United States Patent and Trademark Office*